358-190. OR 3,813,580 SR

United States Patent [19]

Norman

[11] 3,813,580

[45] May 28, 1974

[54] HIGH VOLTAGE PROTECTION CIRCUIT

[75] Inventor: Marvin Neil Norman, Indianapolis, Ind.

[73] Assignee: RCA Corporation, New York, N.Y.

[22] Filed: Jan. 19, 1973

[21] Appl. No.: 325,772

[52] U.S. Cl. ......... 317/23, 178/7.5 R, 178/DIG. 11, 317/31, 317/33 SC, 317/51, 328/9

[51] Int. Cl. .......... H02h 7/20

[58] Field of Search ............. 317/23, 31, 33 SC, 51; 328/8, 9; 178/DIG. 11, 7.5 R

[56] References Cited

UNITED STATES PATENTS 3,502,941 3/1970 Buechel ........................ 178/7.5 R 3,588,608 6/1971 Halinski ........................ 317/31

*Primary Examiner*—James D. Trammell

*Attorney, Agent, or Firm*—Eugene M. Whitacre; Paul J. Rasmussen

[57] ABSTRACT

A high voltage protection circuit for a television receiver for rendering the picture unviewable when the kinescope ultor voltage exceeds a predetermined level. A voltage source representative of the ultor voltage is sensed and causes a switch to operate when a predetermined level is exceeded. The switch controls the operation of the vertical oscillator to collapse the raster under excessive high voltage conditions. The oscillator state also controls the video blanking circuit to cause video blanking during the alarm condition.

5 Claims, 1 Drawing Figure

T4082 ✓
X4076 ✓

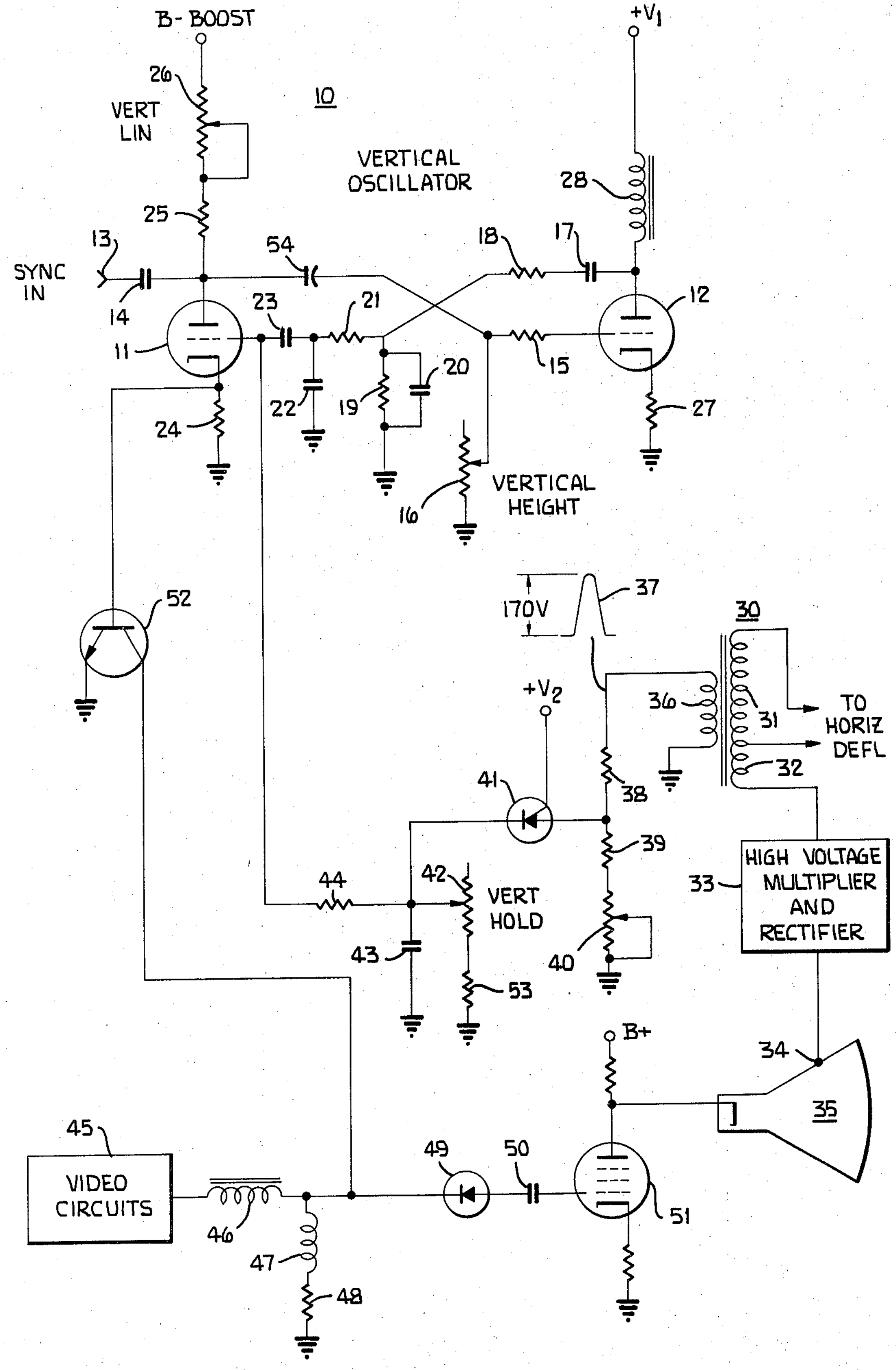
B- BOOST
+V1
10
VERT
LIN
VERTICAL
OSCILLATOR
SYNC
IN
VERTICAL
HEIGHT
170V
TO
HORIZ
DEFL
+V2
VERT
HOLD
HIGH VOLTAGE
MULTIPLIER
AND
RECTIFIER
B+
VIDEO
CIRCUITS

HIGH VOLTAGE PROTECTION CIRCUIT

BACKGROUND OF THE INVENTION

This invention relates to high voltage protection circuits.

It is undesirable to allow the picture tube ultor voltage in a television receiver to rise above a predetermined level, above which there is the possibility of generating X-rays which under certain conditions may be harmful to a viewer. Therefore, it is desirable to have an automatic protection circuit built into the receiver to render the television picture unviewable when the ultor voltage rises above the predetermined level.

Accordingly, it is an object of this invention to provide means for rendering the television picture unviewable when the ultor voltage rises above a predetermined level.

In accordance with one embodiment of the invention, a high voltage protection circuit comprises a voltage source representative of kinescope ultor voltage in a television receiver. A switching means is coupled to the voltage source and is operable from a first to a second state in response to the voltage source exceeding a predetermined level. Circuit means couple the switching means to a deflection rate oscillator such that the oscillator is disabled when the switching means is in its second state, thereby collapsing the scanned raster and making the television display unviewable. A feature of the invention includes means for coupling a signal from the oscillator during its disabled condition to blanking means, which is coupled to a source of video signals such that the video signals are blanked during the high voltage alarm condition.

A more detailed description of the invention is given in the following specification and sole accompanying drawing which illustrates a high voltage protection circuit embodying the invention.

DESCRIPTION OF THE INVENTION

A vertical oscillator 10 of a television receiver is of a conventional type utilizing a synchronized astable multivibrator including a first triode section 11 and a second triode 12. Generally, triode section 12 is conducting during the vertical trace interval of each deflection cycle when triode section 11 is cut off and triode section 11 is conducting during the vertical retrace interval of each deflection cycle when triode 12 is cut off. A brief description of the oscillator 10 operation follows. A source of negative vertical sync pulses, not shown, is coupled to a terminal 13 and through a capacitor 14 to the anode of triode 11 and through a capacitor 54 and a resistor 15 to the grid of triode 12. These negative pulses are inverted by triode 12 and the positive pulses in the triode 12 anode are coupled through capacitor 17, resistor 18, resistor 19, capacitor 20, resistor 21, and capacitors 22 and 23 to the grid of triode 11 to cause it to conduct, thereby initiating the retrace interval. As triode 11 conducts, its decrease in plate voltage is coupled to the grid of triode 12 which cuts it off, interrupting the current flow in primary winding 28 of the vertical output transformer which stops the linear sawtooth current in the vertical deflection coils, not shown, coupled to the vertical output transformer. As the vertical trace current ceases, the magnetic field in the vertical deflection coils collapses and a high positive retrace voltage is developed across vertical output transformer primary winding 28. This positive pulse is coupled to the grid of triode 11 and causes it to develop grid current. This grid current charges capacitor 23 negatively. When the positive pulse decays sufficiently, the negative charge on capacitor 23 turns off triode 11. The consequent rise in triode 11 plate voltage is coupled to the grid of triode 12 and causes it to conduct, terminating the vertical retrace interval and initiating the vertical trace interval. The plate voltage on triode 11 is dependent on the charging of capacitor 14 through resistors 25 and 26 from B-boost. This is a linear sawtooth voltage during trace. This condition continues while capacitor 23 discharges through resistors 21, 19, potentiometer 42, and resistors 44 and 53. The time constant of this discharge circuit adjusted by the vertical hold potentiometer 42 determines the duration of the trace interval, which is selected to be slightly longer than the time between incoming sync pulses. The incoming sync pulses to terminal 13 serves to cut off triode 12 and to initiate the retrace interval. Oscillation is maintained by positive feedback from output section 12 through the waveshaping network comprising capacitor 17, resistors 18, 19, and 21, capacitors 20, 22 and 23, resistors 42, 44 and 53, and capacitor 43.

The video signals obtained from the video circuits 45 of the television receiver are coupled through a delay line 46 in the case of a color television receiver, which delay line is terminated by inductance 47 and resistor 48, through a diode 49 and a capacitor 50 to a video output stage 51. The video signals obtained from the plate of stage 51 drive the cathode of television picture tube 35. A video blanking stage 52 is coupled between the cathode of diode 49 and ground. The operation of the blanking circuit will be described subsequently.

A horizontal output transformer 30 has its primary winding 31 coupled to a conventional horizontal deflection circuit, not shown. A tertiary or high voltage winding 32 of transformer 30 steps up the horizontal retrace pulse which is coupled to a high voltage multiplier and rectifier assembly 33. This assembly provides the high voltage DC potential which is coupled to the ultor terminal 34 of kinescope 35.

An auxiliary winding 36 such as a winding providing the AGC keying pulse for the receiver supplies a retrace or flyback pulse 37 which has a peak positive amplitude of about 170 volts. The amplitude of pulse 37 tracks the variations of the ultor voltage coupled to the kinescope and is thus representative of any variations of the ultor voltage. The flyback pulse 37 is applied across a voltage divider comprising series connected resistors 38, 39 and potentiometer 40.

A unijunction transistor 41 has its anode coupled to the junction of resistors 38 and 39 and its gate electrode coupled to a source of reference potential $+V_2$. The cathode of transistor 41 is coupled to the junction of resistor 44, capacitor 43 and the wiper arm of potentiometer 42. The adjustment of potentiometer 40 is made such that under normal operating conditions the pulse voltage at the junction of resistors 38 and 39 does not exceed the reference voltage $+V_2$. If the voltage at this junction does exceed $+V_2$, it is representative of an undesirable increase in the ultor voltage and transistor 41, acting as a switch, is turned on. Current is then conducted from the $+V_2$ source through the gate-cathode junction of transistor 41 to charge capacitor 43 positively. This positive voltage is coupled to the grid of triode 11 of oscillator 10 and causes it to conduct continuously, thereby preventing further oscillation as long as the excessive high voltage condition exists. The disabling of the vertical oscillator collapses the vertical raster and renders the television picture unviewable as only a single horizontal line is present on the picture tube.

Additionally, the continuously conducting state of triode 11 results in a positive voltage being developed across resistor 24 at its cathode. This positive voltage is coupled to the base electrode of the blanking stage transistor 52, causing it to conduct and thereby provide a low impedance path for the video signals through transistor 52 to ground. The effective removal of the video signals by blanking decreases the cathode drive and hence the beam current of picture tube 35 during the excessive high voltage condition.

When the high voltage returns to its normal value the potential at the junction of resistors 38 and 39 again drops below the $+V_2$ level, opening the unijunction switch 41, allowing capacitor 43 to discharge through potentiometer 42 and resistor 53 and thereby enabling normal operation and oscillation of the vertical oscillator 10. This restores the full scanned raster and with triode 11 no longer conducting continuously, the blanking stage transistor 52 blanks the video only during the vertical retrace interval and permits the video signals to be coupled through diode 49, capacitor 50 and video output stage 51 for normal presentation on the picture tube raster.

What is claimed is:

1. A high voltage protection circuit for a television receiver, comprising:

a voltage source representative of kinescope ultor voltage in said receiver;

switch means coupled to said voltage source and operable from a first to a second state in response to said voltage source exceeding a predetermined level;

a deflection rate oscillator means;

circuit means including a capacitor coupling said switch means to said deflection rate oscillator means such that in response to said second state of said switch means said capacitor is charged, thereby disabling said oscillator means.

2. A high voltage protection circuit according to claim 1 wherein said circuit includes a source of video signals and a blanking means coupled to said source of video signals and said oscillator means, said blanking means being responsive to said disabled condition of said oscillator for blanking said video signals.

3. A high voltage protection circuit according to claim 2 wherein said switch means includes a unijunction transistor having its gate electrode coupled to a source of reference potential such that when said voltage source exceeds said reference potential said switch means operates to its second state and said capacitor is charged from said source of reference potential.

4. A high voltage protection circuit for a television receiver for rendering the kinescope raster unviewable when the ultor voltage exceeds a predetermined level, comprising:

a source of voltage representative of said ultor voltage level;

switching means coupled to said voltage source for switching from a first to a second state when said voltage level exceeds a predetermined level;

circuit means including a capacitor coupled to said switching means for charging said capacitor when said switching means is in said second state;

a vertical deflection rate astable multivibrator including two active current conducting devices coupled to said circuit means including said capacitor such that when said switching means is in said second state the charge on said capacitor prevents said multivibrator from oscillating and causes one of said active devices to conduct a steady state current; and video blanking means coupled to a source of video signals and to said one active device and responsive to said steady state current for blanking said video signals when said switching means is in said second state.

5. A high voltage protection circuit according to claim 4 including a source of reference potential and wherein said switching means includes a unijunction transistor having a gate electrode coupled to said source of reference potential such that when said source of voltage exceeds said reference potential said unijunction transistor conducts and charges said capacitor from said source of reference potential.

* * * * *